United States Patent
Odashima

(10) Patent No.: US 6,708,567 B2
(45) Date of Patent: Mar. 23, 2004

(54) NON-DIRECTIONAL LOAD DETECTING SENSOR

(75) Inventor: Tadashi Odashima, Nagoya (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/946,668

(22) Filed: Sep. 6, 2001

(65) Prior Publication Data
US 2002/0026838 A1 Mar. 7, 2002

(30) Foreign Application Priority Data

Sep. 7, 2000 (JP) ......................................... 2000-271818

(51) Int. Cl.[7] ................................................. G01L 7/08
(52) U.S. Cl. ..................................... 73/715; 73/862.381
(58) Field of Search ........................... 73/818, 84, 146, 73/700, 715–731, 862.381–862.584; 177/210; 192/150; 188/299

(56) References Cited

U.S. PATENT DOCUMENTS

| 2,488,348 A | * | 11/1949 | Ruge ........................... 201/63 |
| 4,506,708 A | * | 3/1985 | Onuma .......................... 141/4 |
| 4,938,056 A | * | 7/1990 | DeRudder et al. ............. 73/49 |
| 5,035,274 A | * | 7/1991 | Kinnick et al. .............. 157/1.1 |
| 5,086,901 A | * | 2/1992 | Petronis et al. ............. 192/150 |
| 5,390,540 A | * | 2/1995 | Mallison ....................... 73/146 |
| 5,467,851 A | * | 11/1995 | Handke et al. ............. 188/299 |
| 5,703,334 A | * | 12/1997 | Hansson et al. ............ 177/201 |
| 6,026,692 A | * | 2/2000 | Brovold ....................... 73/818 |

FOREIGN PATENT DOCUMENTS

| EP | 0 176 173 A2 | 4/1986 |
| JP | 5-131387 | 5/1993 |

* cited by examiner

Primary Examiner—Edward Lefkowitz
Assistant Examiner—Alandra Ellington
(74) Attorney, Agent, or Firm—Griffin & Szipl, PC

(57) ABSTRACT

A fluid-filled elastic hollow body 2, includes a pressure sensor 4 for detecting the pressure of the fluid in the elastic hollow body, and an adapter 6 for coupling the elastic hollow body to an external movable member. The elastic hollow body 2, having a hollow sphere portion 2a having a roughly constant wall thickness, is deformed when an external contact load is applied causing a rise in its inner pressure detected by the pressure sensor 4. The invention provides: (1) that the sensor can accurately measure a contact load without being influenced by a change in direction of force measured; (2) that it can be attached easily and measure a load immediately after attachment; (3) that it is resistant against instantaneous shock load; (4) that it can easily model a substance when it comes in contact therewith; and (5) that its sensitivity does not deteriorate.

12 Claims, 6 Drawing Sheets

NON-DIRECTIONAL LOAD DETECTING SENSOR

BACKGROUND OF THE INVENTION

1. Field of the Invention

The present invention relates to a non-directional load detecting sensor for detecting a contact load without being influenced by a load application direction.

2. Description of the Related Art

The foot tip of a walking robot or the finger tip of a robot hand needs to accurately detect a load which acts on the foot or the finger. Any other general machines other than the robots also often need to detect a contact load when their movable member comes in mechanical contact with an external member.

Conventionally, to detect such a contact load, typically a strain gage has been attached to part of the member to thereby measure a change in potential caused by a change in a resistance due to the contact load when they came in contact with each other. Besides, there have been developed also a load cell to which a strain gage is applied and a six-axial tension sensor module for detecting a load application direction.

Those strain gage, load cell, six-axial tension sensor, have the following problems.

(1) The direction of a force that can be detected is limited by a sensor or a direction in which the sensor is attached. In the case of a strain gage or a load cell, it is necessary to know beforehand a direction in which a load acts, so that if that direction does not same with an expected direction, a large error is produced, thus disabling accurate measurement. Moreover, a six-axial sensor can indeed detect a load application direction too but the sensor itself is complicated and large sized.

(2) A strain gage requires a measure of time and labor for its attachment. That is, for accurate measurement it is necessary to attach it using a dedicated adhesive agent, so that measurement is impossible until the agent hardens completely.

(3) A strain gage is not so resistant to an instantaneous excessive force and so its body may be damaged when affected by an excessive shock. More precisely, the gage itself is not damaged by an excessive force but a member attaching the gage is distorted permanently, thus disabling maintaining an accuracy in measurement. Although a load cell or a six-axial tension sensor can use a stopper etc. to prevent an excessive force from being transmitted to an internal sensor (strain gage etc.), its structure is complicated and large sized.

(4) Contact between rigid bodies makes it difficult to model a subject to be controlled. That is, when a rigid portion of the robot comes in contact with a rigid subject such as a floor, a shock is resultantly produced, so that an excessive load periodically has an action instantaneously, thus making it difficult for the robot to model the subject etc. at that moment of contact.

Further, to solve the problems (3) and (4), a spring-component element may be attached to the tip of a load sensor, in which case, however, the sensitivity of the load sensor can be deteriorated.

SUMMARY OF THE INVENTION

The present invention is devised to solve the above mentioned problems. That is, it is an object of the present invention to provide such a non-directional load detecting sensor: (1) that can accurately measure a contact load without being influenced by a direction, if changed, of a force to be measured; (2) that can be attached easily so that it can measure a load immediately after being attached; (3) that can well withstand an instantaneous shock load; (4) that can easily model a subject at the time of contact therewith; and (5) that is not deteriorated in sensitivity of its sensor.

The present invention provides a non-directional load detecting sensor comprising an elastic hollow body (2) in which a fluid is filled tightly, a pressure sensor (4) for detecting the pressure of the fluid in the elastic hollow body, and an adapter (6) for coupling the elastic hollow body to an external movable member.

By this configuration of the present invention, a fluid is filled tightly in the elastic hollow body (2), so that when this elastic hollow body comes in contact with an external substance, it is partially deformed to thereby raise the pressure of the fluid contained therein. This rise in pressure in turn can be detected by the pressure sensor (4), thus measuring a contact load. Moreover, by using the adapter to couple the elastic hollow body to an external movable member, the sensor can be easily attached to thereby measure the load immediately. Therefore, this non-directional load detecting sensor can be attached to, for example, the foot tip of a walking robot or the finger tip of a robot hand to thereby accurately detect a load which acts on the foot tip or the finger tip.

Furthermore, a rise in pressure caused by deformation of the elastic hollow body (2) is detected in configuration by the pressure sensor (4) to thereby permit the elastic hollow body to act as a buffer, thus making the sensor well resistant to an instantaneous shock load and exempting it from a deterioration in sensitivity. Moreover, the sensor can easily model a subject when it comes in contact therewith because it is not subject to a rapid change in load such as a shock load.

According to a preferred embodiment of the present invention, the pressure sensor (4) comprises an introducing tube (4a) for introducing a fluid contained in the elastic hollow body and a detecting portion (4b) for detecting the pressure of the introduced fluid, which elastic hollow body (2) is comprised of a hollow sphere portion (2a) having almost a constant wall thickness and a communicating portion (2b) for holding the introducing tube (4a) tightly to communicate the fluid in the hollow sphere body to the introducing tube. The communicating portion (2b) preferably has a larger wall thickness so that it may not be deformed by a change in the pressure of the hollow sphere body (2a).

By this configuration, the spherical hollow sphere portion (2a) can be deformed in proportion to the magnitude of a contact load, thus enabling accurately measuring the contact load without being influenced by the load application direction. In addition, only by inserting the introducing tube (4a) into the communicating portion (2b), it is possible to introduce the internal fluid to the detecting portion (4b) and then measure its pressure with the hollow sphere portion as sealed.

The adapter (6) tightly surrounds the communicating portion (2b) of the elastic hollow body (2) to thereby enhance the fluid-tightness between the introducing tube (4a) and the communicating portion (2b) and also is coupled to part of the hollow sphere portion (2a).

By this configuration, it is possible to enhance the fluid-tightness between the introducing tube (4a) and the communicating portion (2b) to thereby prevent leakage of the internal fluid and also to attach part of the hollow sphere portion (2a) through the adapter (6) to, for example, the foot tip of a walking robot and the finger tip of a robot hand.

Further, the wall thickness and the hardness of the hollow sphere portion (2a) are set so that an external force acting on a semispherical portion of the hollow sphere portion (2a) positioned opposite the communicating portion (2b) may be roughly proportional to an output of the pressure sensor (4).

By this configuration, the contact load (external force) and the output of the pressure sensor (4) are proportional to each other, thus enabling easily knowing a contact load from that sensor output.

The above and other objects, advantages, and features of the present invention will be more apparent from the following description taken in conjunction with the accompanying drawings.

DESCRIPTION OF THE PREFERRED EMBODIMENTS

Figure 1A:
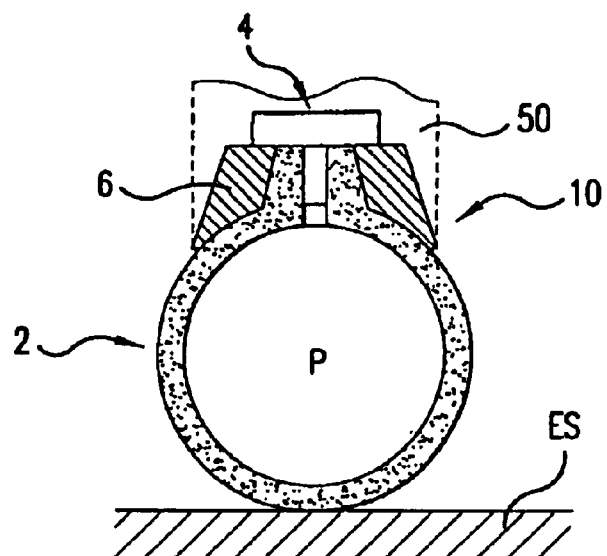
FIGS. 1A and 1B are overall configuration diagrams for showing a non-directional load detecting sensor according to an embodiment of the present invention.

The following will describe embodiments of the present invention with reference to the drawings. In those figures, the common elements are indicated by the same reference numerals to avoid double explanation.

Figure 1B:
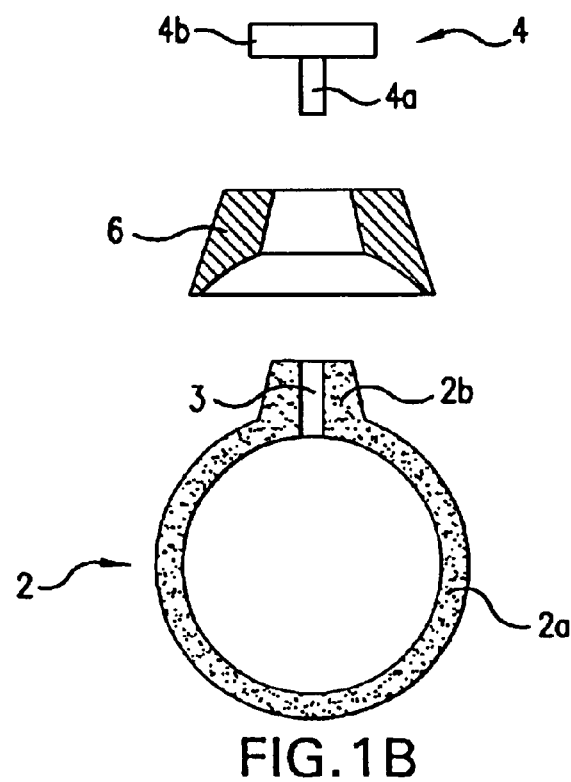

FIGS. 1A and 1B are overall configuration diagrams for showing a non-directional load detecting sensor according to an embodiment of the present invention. FIG. 1A is a vertical cross-sectional view for showing a state where it is assembled and FIG. 1B, a state where it is disassembled. As shown in them, a non-directional load detecting sensor 10 of the present invention comprises an elastic hollow body 2, a pressure sensor 4, and an adapter 6.

The elastic hollow body 2 in this case, includes a hollow sphere portion 2a having roughly a constant wall thickness and a communicating portion having a larger wall thickness (thicker portion) 2b. The communicating portion 2b has a through hole 3 formed therein for communicating the interior and the exterior of the hollow sphere portion 2a with each other. Moreover, the communicating portion 2b is in this case formed head-off conical, thus easily coming in contact with an adapter 6 tightly. Further, by inserting an introducing tube 4a of a pressure sensor 4 described later into the through hole 3 in the communicating portion 2a, the fluid in the hollow sphere portion 2a can be communicated to the introducing tube 4a with the hollow sphere portion as sealed tightly.

The elastic hollow body 2 is made of silicon rubber in this case, in which a fluid at a normal pressure (atmospheric pressure) is filled tightly. The elastic hollow body 2 may be made of other flexible materials such as natural rubber, synthetic rubber, etc. The fluid to be filled tightly in it may be, besides an air, an inert gas or other fluids as necessary. Moreover, the fluid to be filled tightly may be pressured as necessary. In addition, it is important to select the fluid which volume change by temperature change is small.

The pressure sensor 4 comprises an introducing tube 4a for introducing a fluid from the elastic hollow body 2 and a detecting portion 4b for detecting the pressure of this introduced fluid. The introducing tube 4a is a hollow cylinder having a diameter somewhat larger than that of the through hole 3 in the hollow sphere portion 2a so as to prevent a fluid from leaking from its inserting portion. Additionally, the detecting portion 4b is fitted with, for example, a strain gage or piezoelectric element, to thereby output an electric signal proportional to a pressure inside the elastic hollow body 2. The pressure sensor 4 may be a commercially available one such as a PF pressure sensor made by Matsushita Seigyo Company.

The configuration of the pressure sensor 4 is not limited to this example. For example, the introducing tube 4a may be elongated enough to place the detecting portion 4b at a remote position. Moreover, the pressure sensor 4 may be entirely enclosed in the elastic hollow body 2 to output the signal therefrom, thus completely preventing the leakage of the fluid. In this case, it is necessary to use such a sensor that can measure an absolute pressure in place of the sensor for detecting a relative pressure difference with respect to the atmospheric pressure.

The adapter is so formed as to tightly surround the communicating portion 2b of the elastic hollow body 2 to thereby enhance the fluid-tightness between the introducing tube 4a and the communicating portion 2b. In addition, the inner profile of the adapter 6 is in this case formed head-off conical like the communicating portion 2b so that they may be fit to each other at their conical profiles. Further, the adapter 6 has another portion thereof coupled securely through an adhesive agent or a knob 2c described later to part of the hollow sphere portion 2a. By this configuration, the adapter 6 can be coupled to an external movable member (e.g., the foot tip of a walking robot or the finger tip of a robot hand) to thereby fix a non-directional load detecting sensor 10 entirely.

The non-directional load detecting sensor 10 according to the present invention operates as follows.

When the foot tip or the finger tip of the non-directional load detecting sensor 10 attached to the foot tip of a walking robot or the finger tip of a robot hand comes in contact with a floor or any other subject gripped, first the hollow rubber ball (elastic hollow body 2) actually comes in contact with it and receives a contact load immediately to cause a rise in the pressure in the rubber ball. This rise in pressure is in turn detected by the pressure sensor to thereby measure the load as a change in voltage.

Since the elastic hollow body 2 encounters a rise in its internal pressure P because it is deformed by a force applied in any direction independence on a direction in which the sensor 4 is attached thereto, it can measure a load applied in any direction. Moreover, since its contact point is formed of a rubber ball, it is possible to avoid contact between rigid bodies, thus eliminating difficulty in modeling. Further, in contrast to a prior art example of attaching an element having a spring component to the existing force sensor to thereby avoid contact with a rigid body, in this embodiment, a distortion itself of the spring-component element (rubber ball) enables detecting a force, thus avoiding deteriorating the sensitivity of the force sensor. In addition, the sensor can be attached easily to a robot or any other apparatus because it is done so through an adapter therebetween. Moreover, the sensor can be made up of a smaller number of components and so compacted, thus being able to be attached easily to the foot tip of a walking robot or the finger tip of a robot hand.

Figure 2A:
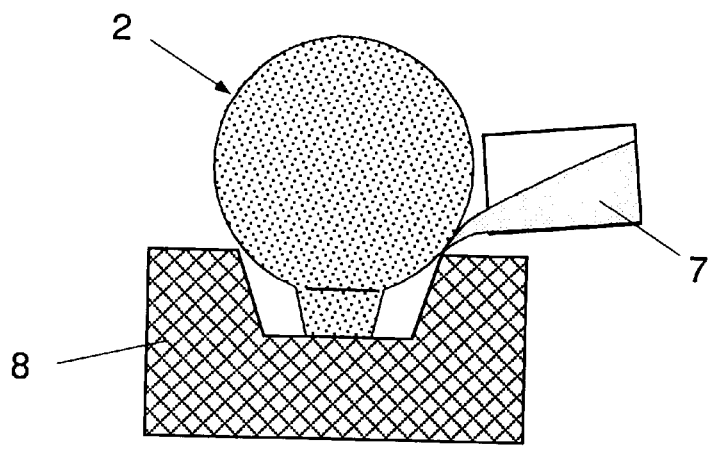
FIGS. 2A, 2B, and 2C are illustrations for showing sequential steps of manufacturing the non-directional load detecting sensor according to the present invention.
Figure 2B:
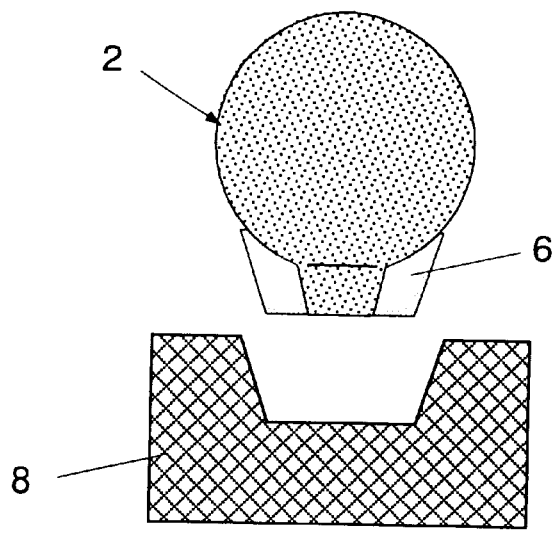
Figure 2C:
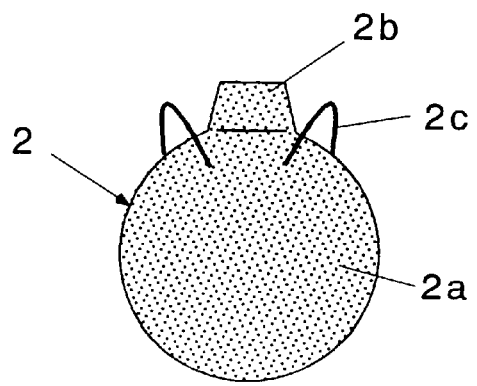

FIGS. 2A, 2B, and 2C are illustrations for showing sequential steps of manufacturing the non-directional load detecting sensor according to the present invention. Of these, FIGS. 2A and 2B show steps for manufacturing the adapter 6 and FIG. 2C shows a configuration of the elastic hollow body 2 used in these steps.

The adapter 6 is indispensable for interconnecting the non-directional load detecting sensor 10 and an apparatus. It also serves to fix to each other the rubber portion (hollow sphere portion 2a) with a low hardness and the pressure sensor 4. Since the adapter 6 and the hollow rubber ball 2 made of silicon rubber cannot easily be adhered to each other because of the properties of their materials, they are unified by mechanical joining by use of a knob 2c fixed on the hollow rubber ball 2.

That is, the non-directional load detecting sensor made on a trial basis was actually manufactured by pouring a molding polyurethane resin 7 which the adapter 6 is made of between the hollow rubber ball 2 and a mold 8 having a shape of the adapter 6. Moreover, the knob 2c fixed on the hollow rubber ball 2 was actually contained in the adapter by integrating the hollow rubber ball 2 and a silicon-made string made of the same material with each other beforehand, thus integrating the rubber ball and the adapter with each other. Note here that the knob 2c may be of any shape other than a string, for example, a U-shape or T-shape.

Figure 3A:
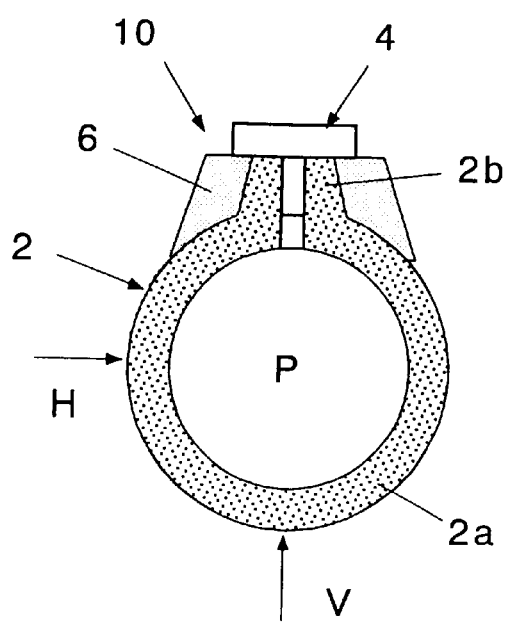
FIGS. 3A, 3B, 3C, and 3D are illustrations for showing another embodiment of the non-directional load detecting sensor according to the present invention.
Figure 3B:
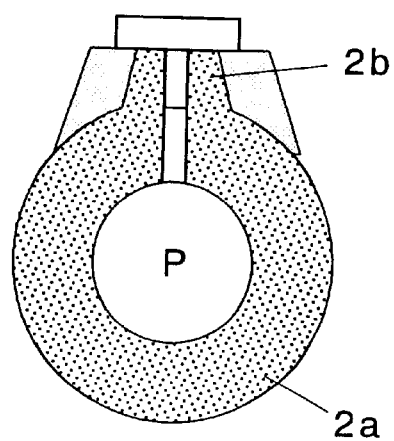

FIGS. 3A, 3B, 3C, and 3D show another embodiment of the non-directional load detecting sensor according to the present invention. Of these, FIGS. 3A and 3B show the same configuration as above with an exception of the wall thickness and FIGS. 3C and 3D, a configuration in which the adapter is integrally formed into the elastic hollow body. In this case, the elastic hollow body 2 is provided with a mechanical strength at part thereof to such an extent that it may play one role of the adapter of "connection with the apparatus".

Figure 3C:
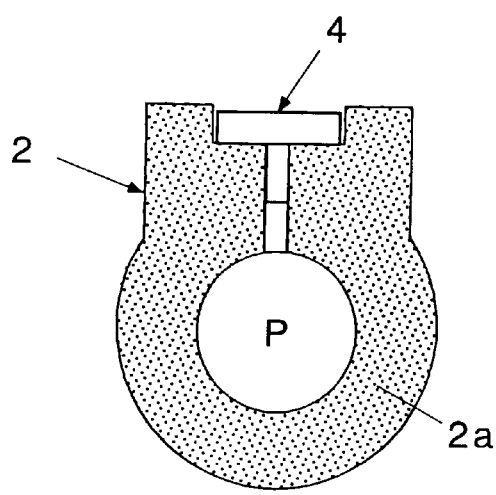
Figure 3D:
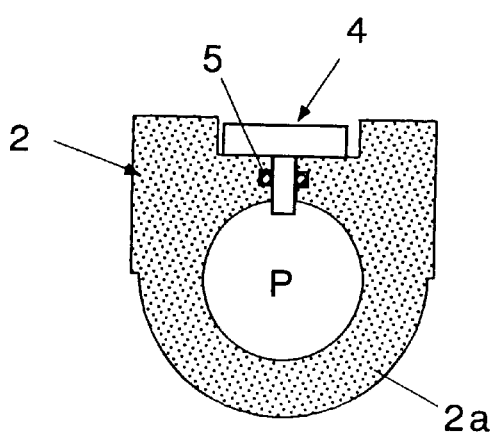

By changing the thickness of the hollow sphere portion 2a as shown in FIGS. 3A and 3B, a relationship between an external force and the sensor output can be adjusted (optimized) as described later. Moreover, by integrally forming the adapter into the elastic hollow body 2 as shown in FIG. 3C, the non-directional load detecting sensor 10 can be simplified further. In addition, if the direction in which a load is applied is determined to some extent, as shown in FIG. 3D, the hollow sphere portion 2a can be made roughly semispherical to thereby minimize the non-directional load detecting sensor further. Furthermore, as shown in the figure, by using a seal element 5 (e.g., O-ring), the internal fluid can be prevented from leaking out more completely.

Figure 4A:
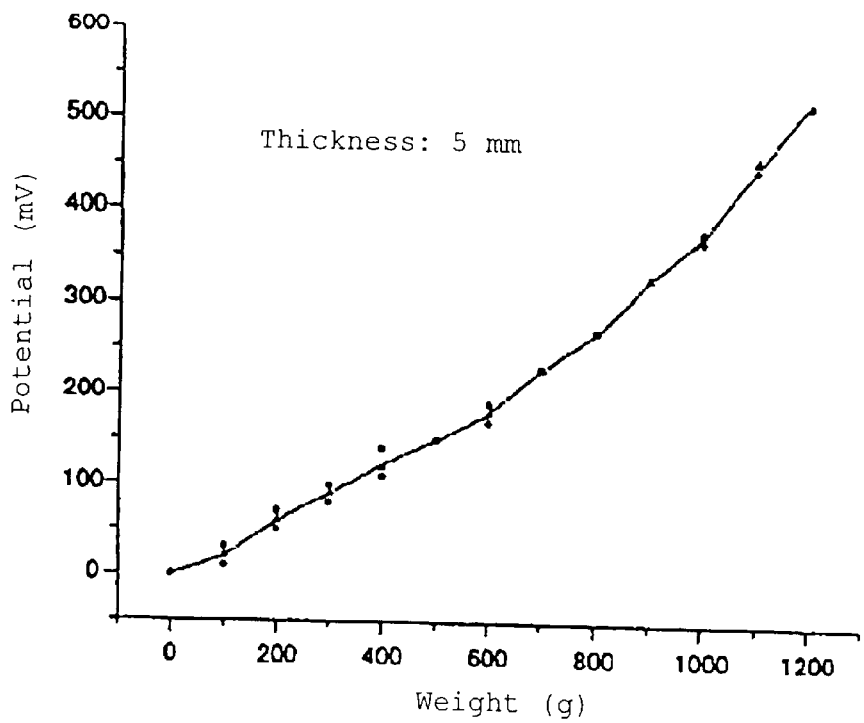
FIGS. 4A and 4B are graphs for indicating data of an example of the non-directional load detecting sensor of the present invention.
Figure 4B:
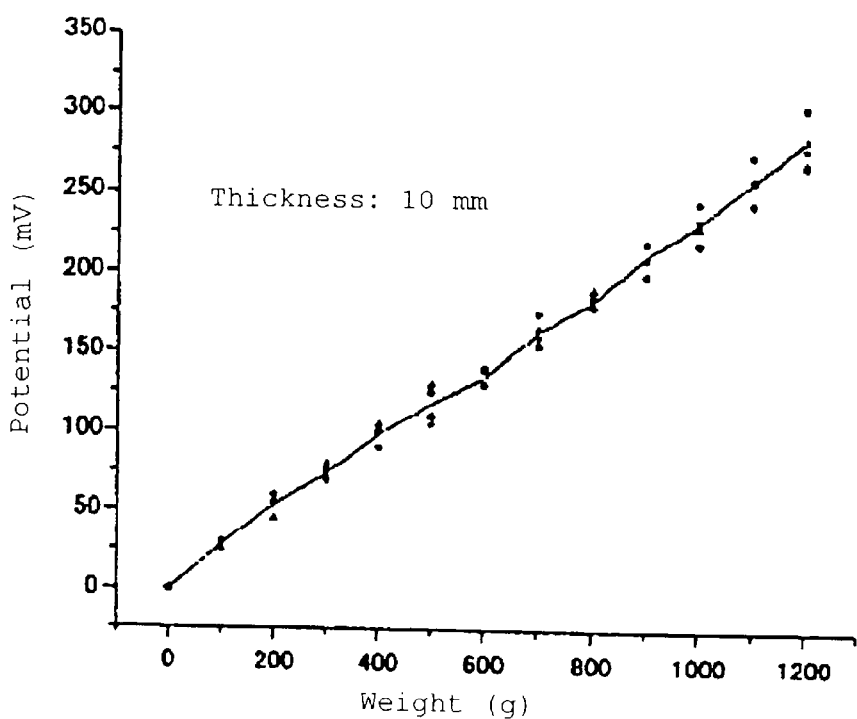

FIGS. 4A and 4B are graphs for indicating an example of the non-directional load detecting sensor according to the present invention. Of these, FIG. 4A indicates a case where the hollow sphere portion 2a has an outer diameter of 40 mm and a wall thickness of 5 mm and FIG. 4B a case where it has the same outer diameter of 40 mm as that and a wall thickness of 10 mm. That is, FIG. 4A corresponds to FIG. 3A and FIG. 4B, to FIG. 3B. In this example, the horizontal axis in both figures indicates a vertical (V-direction in FIG. 3A) load and the vertical axis indicates an output voltage of the pressure sensor 4.

That is, in this example, a load from 0 g to 1200 g was applied in a 100-grams step to the non-directional load detecting sensor using two kinds of hollow rubber balls having a common outer diameter value of 40 mm and thickness values of 5 mm and 10 mm respectively, to measure an output of the sensor. As the pressure sensor 4 was used a PF pressure sensor (ADP1101) made by Matsushita Seigyo Company. An output of this pressure sensor under application of 5.1 V was amplified about 140-fold and measured. In the graphs, the straight line indicates an average of data values measured a plurality of times.

FIGS. 4A and 4B show that the thicker ball (FIG. 4B) exhibits a excellent linearity against the load. This is probably because the thinner rubber ball had a too large distortion against the load. Although the load that can be measure depends on the thickness, hardness, and outer diameter of the rubber ball and the sensitivity of the pressure sensor, the above should preferably be taken into account to increase the thickness or the hardness of the rubber ball in order to accommodate a larger load to be measured. That is, provisions should preferably be included to avoid an excessive distortion of the rubber ball.

Both cases came up with almost the same values as given above independently on a direction in which the load was applied to the rubber ball. Therefore, it is preferable to set the wall thickness and the hardness of the hollow sphere portion 2a such that the external force (in both V and H directions in FIG. 3A) acting on the semi-sphere portion of the hollow sphere portion 2a (i.e., an arbitrary position on the lower semi-sphere of the hollow sphere portion 2a in FIG. 3) positioned on the opposite side of the communicating portion 2b may be roughly proportional to the output of the pressure sensor 4. That is, in actual application, it is necessary to design respectively the sensitivity of the pressure sensor and the hardness (thickness and material) of the rubber ball corresponding to a force to be measured and the shape of the adapter and the rubber ball corresponding to a position where the sensor is attached.

Figure 5A:
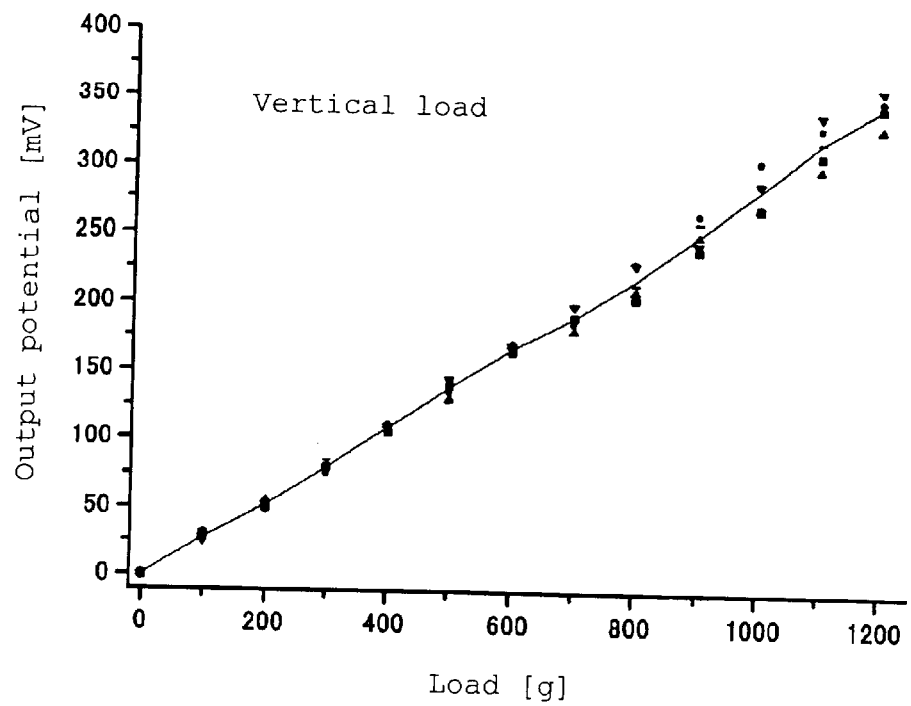
FIGS. 5A and 5B are graphs for indicating data of another example of the non-directional load detecting sensor of the present invention.
Figure 5B:
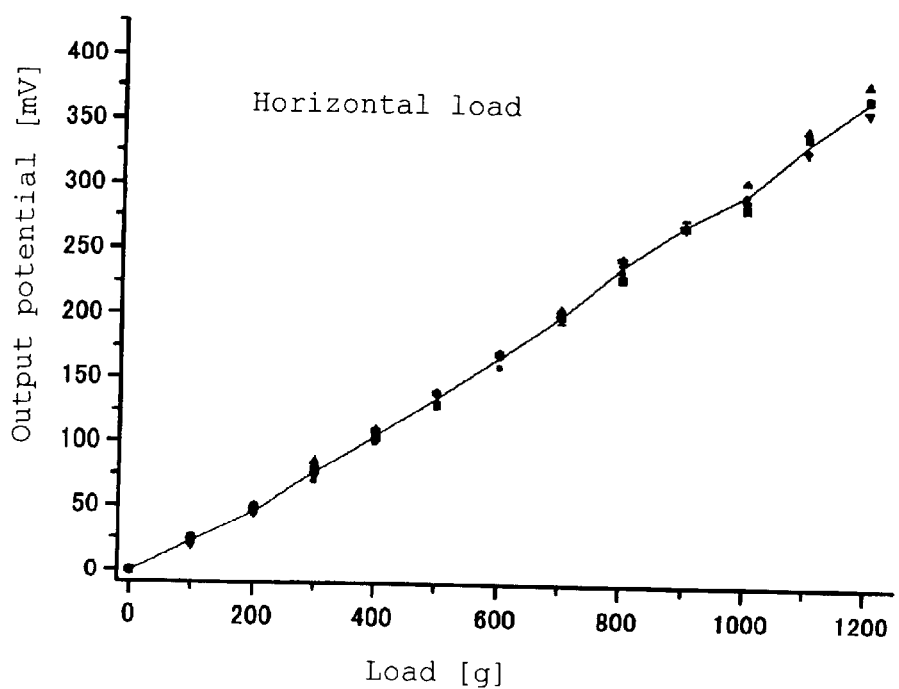

FIGS. 5A and 5B are graphs for showing another example of the non-directional load detecting sensor of the present invention, of which FIG. 5A indicates a relationship between a vertical load (V-directional load in FIG. 3A) and an output and FIG. 5B, a relationship between a horizontal load (H-directional load in FIG. 3A) and an output. Further, FIG. 6 indicates comparison between the vertical and horizontal loads for the non-directional load detecting sensor of the present invention. In this experiment, a non-directional load detecting sensor corresponding to FIG. 3B was used.

Figure 6:
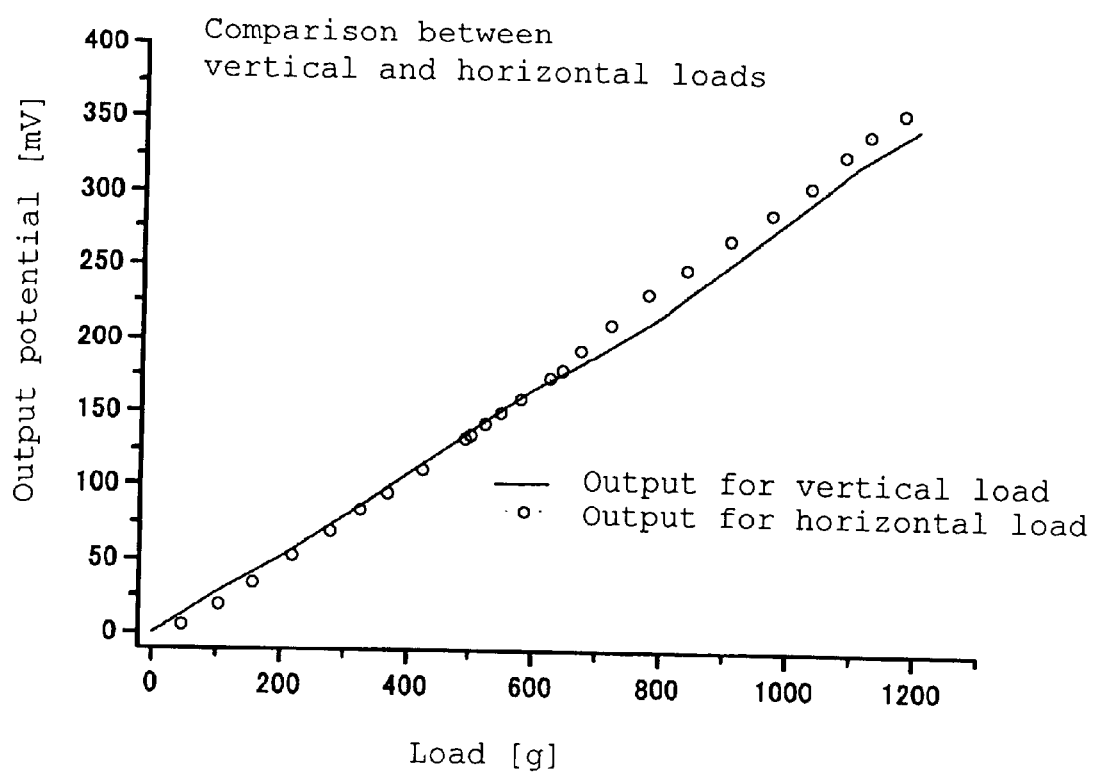
FIG. 6 is a graph for indicating comparison between vertical and horizontal loads by the non-directional load detecting sensor of the present invention.

FIGS. 5A, 5B, and 6 show that with the non-directional load detecting sensor 10 according to the present invention 10, the output voltage for a vertical load mostly same with that for a horizontal load. Moreover, it can be known that the same output signal will be obtained for a contact load applied in any direction including the vertical and horizontal directions except for the communicating portion 2b with a large wall thickness, taking into account that the hollow sphere portion 2a of this non-directional load detecting sensor is a sphere having almost a constant wall thickness.

That is, it was confirmed that by the configuration of the present invention, it is possible to deform the ball-shaped hollow sphere portion 2a in proportion to the magnitude of a contact load to thereby accurately measure the contact load without being influenced by the load application direction.

As described above, by the configuration of the present invention, a fluid is filled tightly in the elastic hollow body 2, so that when this elastic hollow body 2 comes in contact with an external substance ES, it is partially deformed to raise its internal fluid pressure P. This rise in pressure can be, in turn, detected to thereby measure a contact load. Additionally, the elastic hollow body 2 can be attached easily by coupling it via the adapter 6 to an external movable member 50, to enable immediate measurement as well. Therefore, this non-directional load detecting sensor 10 can be attached to, for example, the foot tip of a walking robot or the finger tip of a robot hand to thereby accurately detect a load on that foot or the finger tip.

Furthermore, a rise in pressure caused by a deformation of the elastic hollow body 2, which serves as a buffer material, is detected by the pressure sensor, so that the sensor is well resistant against an instantaneous shock load and exempted from a deterioration in sensitivity. Moreover, it is free of a rapid change in load such as of a shock load and so can easily model a substance when it comes in contact therewith.

Furthermore, the ball-shaped hollow sphere portion 2a can be deformed in proportion to the magnitude of a contact load to thereby accurately measure the contact load without being influenced by the load application direction. Moreover, only by inserting the introducing tube 4a into the communicating portion 2b, an internal fluid contained in the hollow sphere portion 2a as sealed can be introduced to the detecting portion 4b to thereby measure its pressure.

Therefore, the non-directional load detecting sensor according to the present invention has such excellent effects: (1) that it can accurately measure a contact load without influenced by any changing direction in which a force to be measure is applied; (2) that it can be attached easily and measure a load immediately after being attached; (3) that it is well resistant against an instantaneous shock load; (4) that it can easily model a substance when it comes in contact therewith; and (5) that it is free from deterioration in sensitivity.

The present invention is of course not limited to the above embodiments and can be changed variously without departing the gist thereof.

What is claimed is:

1. A non-directional load detecting sensor comprising:
an elastic hollow body in which a fluid is filled tightly;
a pressure sensor for detecting a pressure of the fluid in the elastic hollow body, wherein the pressure sensor includes an introducing tube for introducing a fluid in the elastic hollow body and a detecting portion for detecting a pressure of the introduced fluid, and the elastic hollow body includes a hollow sphere portion having a roughly constant wall thickness and a communicating portion for communicating the fluid in the hollow sphere portion to the introducing tube while holding the introducing tube tightly; and
an adapter for coupling the elastic hollow body to an external movable member therethrough, wherein the wall thickness and a hardness of the hollow sphere portion are set so that an external force acting on a semi-sphere portion of the hollow sphere portion positioned on the opposite side of the communicating portion is roughly proportional to an output of the pressure sensor.

2. A non-directional load detecting sensor comprising:
an elastic hollow body in which a fluid is filled tightly;
a pressure sensor disposed to detect a pressure of the fluid in the elastic hollow body; and
an adapter joined to the elastic hollow body so that the adapter couples the elastic hollow body to an external movable member so that when the elastic hollow body comes in contact with an external substance the elastic hollow body is deformed, which raises the pressure of the fluid.

3. A non-directional load detecting sensor as recited in claim 2, wherein the elastic hollow body is made of silicon rubber.

4. A non-directional load detecting sensor as recited in claim 2, wherein the elastic hollow body is a hollow rubber ball.

5. A non-directional load detecting sensor as recited in claim 2, wherein the pressure sensor is selected from the group consisting of a strain gage, a piezoelectric element, and a PF pressure sensor.

6. A non-directional load detecting sensor as recited in claim 2, wherein the elastic hollow body and the adapter are joined by being integrally molded together.

7. A non-directional load detecting sensor comprising:
an elastic hollow body in which a fluid is filled tightly;
a pressure sensor disposed to detect a pressure of the fluid in the elastic hollow body;
an adapter joined to the elastic hollow body; and
an external movable member coupled by the adapter to the elastic hollow body.

8. A non-directional load detecting sensor as recited in claim 7, wherein the elastic hollow body is made of silicon rubber.

9. A non-directional load detecting sensor as recited in claim 7, wherein the elastic hollow body is a hollow rubber ball.

10. A non-directional load detecting sensor as recited in claim 7, wherein the external movable member is selected from the group consisting of a foot tip of a walking robot and a finger tip of a robot hand.

11. The non-directional load detecting sensor according to claim 7, wherein:
said pressure sensor includes an introducing tube for introducing a fluid in said elastic hollow body and a detecting portion for detecting a pressure of said introduced fluid; and
said elastic hollow body includes a hollow sphere portion having a roughly constant wall thickness and a communicating portion for communicating the fluid in said hollow sphere portion to said introducing tube while holding said introducing tube tightly.

12. The non-directional load detecting sensor according to claim 11, wherein said adapter tightly surrounds said communicating portion of said elastic hollow body to thereby enhance fluid-tightness between said introducing tube and said communicating portion and said adapter is also coupled to part of said hollow sphere portion.

* * * * *